(12) United States Patent
Kiga (10) Patent No.: US 10,092,983 B2
(45) Date of Patent: Oct. 9, 2018

(54) BRAZING COMPOSITION, HEAT EXCHANGER TUBE, AND HEAT EXCHANGER

(71) Applicant: HARIMA CHEMICALS, INCORPORATED, Kakogawa-shi, Hyogo (JP)

(72) Inventor: Daigo Kiga, Hyogo (JP)

(73) Assignee: HARIMA CHEMICALS, INCORPORATED, Kakogawa-Shi, Hyogo (JP)

( * ) Notice: Subject to any disclaimer, the term of this patent is extended or adjusted under 35 U.S.C. 154(b) by 174 days.

(21) Appl. No.: 14/431,840

(22) PCT Filed: Sep. 26, 2013

(86) PCT No.: PCT/JP2013/076005
§ 371 (c)(1),
(2) Date: Mar. 27, 2015

(87) PCT Pub. No.: WO2014/065074
PCT Pub. Date: May 1, 2014

(65) Prior Publication Data
US 2015/0239071 A1  Aug. 27, 2015

(30) Foreign Application Priority Data
Oct. 24, 2012 (JP) ................. 2012-235159

(51) Int. Cl.
*B23K 35/36* (2006.01)
*B23K 35/02* (2006.01)
(Continued)

(52) U.S. Cl.
CPC .......... *B23K 35/0244* (2013.01); *B23K 35/28* (2013.01); *B23K 35/282* (2013.01);
(Continued)

(58) Field of Classification Search
CPC ..................................................... B23K 35/36
See application file for complete search history.

(56) References Cited

U.S. PATENT DOCUMENTS

| 5,450,666 A * | 9/1995 | Conn | B23K 35/3605 148/23 |
| 6,497,770 B2 * | 12/2002 | Watsuji | B23K 35/025 148/23 |

(Continued)

FOREIGN PATENT DOCUMENTS

| EP | 1127653 A2 | 8/2001 |
| EP | 2002923 A2 | 12/2008 |

(Continued)

OTHER PUBLICATIONS

International Search Report (PCT/ISA/210) dated Dec. 24, 2013, by the Japanese Patent Office as the International Searching Authority for International Application No. PCT/JP2013/076005.

(Continued)

*Primary Examiner* — Matthew E. Hoban
(74) *Attorney, Agent, or Firm* — Buchanan, Ingersoll & Rooney PC (57) ABSTRACT

A brazing composition contains 1 part by mass or more and 10 parts by mass or less of Zn powder, 1 part by mass or more and 5 parts by mass or less of Si powder, 3 parts by mass or more and 10 parts by mass or less of K—Al—F flux, 1 part by mass or more and 3 parts by mass or less of (meth)acrylic resin, wherein the mass ratio (Zn/Si) of Zn powder relative to Si powder is 1 or more and 5 or less.

3 Claims, 1 Drawing Sheet

(51) Int. Cl.
*B23K 35/28* (2006.01)
*B23K 35/362* (2006.01)
*F28F 21/08* (2006.01)
*F28D 1/053* (2006.01)
*F28F 1/12* (2006.01)
*B23K 101/06* (2006.01)
*B23K 101/14* (2006.01)

(52) U.S. Cl.
CPC ........ *B23K 35/362* (2013.01); *B23K 35/3605* (2013.01); *B23K 35/3613* (2013.01); *F28D 1/05383* (2013.01); *F28F 1/126* (2013.01); *F28F 21/084* (2013.01); *F28F 21/089* (2013.01); *B23K 2201/06* (2013.01); *B23K 2201/14* (2013.01)

(56) References Cited

U.S. PATENT DOCUMENTS

| | | |
|---|---|---|
| 2002/0005230 A1 | 1/2002 | Watsuji et al. |
| 2009/0165893 A1 | 7/2009 | Akazawa et al. |
| 2010/0116472 A1 | 5/2010 | Katsumata et al. |
| 2013/0118013 A1 | 5/2013 | Yamashita et al. |

FOREIGN PATENT DOCUMENTS

| | | |
|---|---|---|
| JP | 11-221696 A | 8/1999 |
| JP | 2001-293593 A | 10/2001 |
| JP | 2006-255755 A | 9/2006 |
| JP | 2009-058139 A | 3/2009 |
| JP | 2009-166122 A | 7/2009 |
| JP | 2010-075966 A | 4/2010 |
| WO | WO 2011/090059 A1 | 7/2011 |
| WO | WO 2011/148781 A1 | 12/2011 |
| WO | WO 2012/026823 A1 | 3/2012 |

OTHER PUBLICATIONS

Written Opinion (PCT/ISA/237) dated Dec. 24, 2013, by the Japanese Patent Office as the International Searching Authority for International Application No. PCT/JP2013/076005.

PCT International Preliminary Report on Patentability (IPRP) and Written Opinion dated May 7, 2015, in corresponding International Application No. PCT/JP2013/076005 (11 pages).

Extended Search Report issued by the European Patent Office in corresponding European Patent Application No. 13849003.2 dated Jun. 3, 2016 (10 pages).

* cited by examiner

BRAZING COMPOSITION, HEAT EXCHANGER TUBE, AND HEAT EXCHANGER

TECHNICAL FIELD

The present invention relates to a brazing composition, a heat exchanger tube, and a heat exchanger. To be specific, the present invention relates to a brazing composition, a heat exchanger tube produced by using the brazing composition, and a heat exchanger.

BACKGROUND ART

Conventionally, in aluminum heat exchangers used for, for example, automobiles, a composite member produced by, for example, brazing (joining) fins to an aluminum or aluminum alloy-made heat exchanger tube.

For example, Patent Document 1 below has proposed, as a composite member used for aluminum heat exchangers, to be specific, an aluminum-made heat exchanger member produced by brazing, for example, tubes and fins, with a coating containing Si powder having a maximum particle size of 30 μm or less, and fluoride flux such as $KAlF_4$, and furthermore, a binder, and a solvent.

In such an aluminum-made heat exchanger member, brazing performance is ensured by blending Si powder in the flux.

For example, Patent Document 2 below has proposed using a composite material brazed to tubes in aluminum heat exchangers. For example, the composite material for brazing includes a substrate composed of aluminum or an aluminum alloy, and a Zn cover layer (coating for brazing) formed on the substrate and containing a flux composition such as $KAlF_4$, and Zn powder.

In such a composite material for brazing, blending the Zn powder in the flux composition forms the Zn cover layer, improving corrosion resistance.

CITATION LIST

Patent Document

Patent Document 1
Japanese Unexamined Patent Publication No. 2009-58139
Patent Document 2
Japanese Unexamined Patent Publication No. 2010-75966

SUMMARY OF THE INVENTION

Problem to be Solved by the Invention

Meanwhile, for the aluminum heat exchanger, various effects are required to be exhibited at the same time, for example, more excellent brazing performance and corrosion resistance, and furthermore, adherence of brazing.

Thus, for example, mixing both Si powder and Zn powder in the flux is considered, but just mixing the Si powder and the Zn powder in the flux is disadvantageous in that these various effects cannot be achieved in good balance.

An object of the present invention is to provide a brazing composition having brazing performance, corrosion resistance, and adherence in good balance; a heat exchanger tube produced by using the brazing composition, and a heat exchanger.

Means for Solving the Problem

A brazing composition of the present invention contains 1 part by mass or more and 10 parts by mass or less of Zn powder, 1 part by mass or more and 5 parts by mass or less of Si powder, 3 parts by mass or more and 10 parts by mass or less of K—Al—F flux, and 1 part by mass or more and 3 parts by mass or less of (meth)acrylic resin, wherein the mass ratio (Zn/Si) of Zn powder relative to Si powder is 1 or more and 5 or less.

It is preferable that the brazing composition of the present invention further contains a polyhydric alcohol having 3 or less carbon atoms that are bonded by a carbon-carbon bond.

A heat exchanger tube of the present invention includes a tube main body and a coating for brazing formed at an external surface of the tube main body from the above-described brazing composition, wherein in the coating for brazing, the total amount of Zn powder, Si powder, a K—Al—F flux, and (meth)acrylic resin is 6 $g/m^2$ or more and 20 $g/m^2$ or less.

A heat exchanger of the present invention is produced by using the above-described heat exchanger tube.

Effect of the Invention

The brazing composition of the present invention contains Zn powder, Si powder, a K—Al—F flux, and (meth)acrylic resin in a specific ratio, and therefore can achieve brazing performance, corrosion resistance and adherence in good balance.

Furthermore, in the heat exchanger tube of the present invention and the heat exchanger of the present invention, the brazing composition of the present invention is used, and therefore excellent brazing performance, corrosion resistance, and adherence can be achieved.

EMBODIMENT OF THE INVENTION

The brazing composition of the present invention contains Zn (zinc) powder, Si (silicon) powder, a K—Al—F flux, and (meth)acrylic resin.

The Zn powder is not particularly limited, and those having an average particle size (measurement device: laser diffraction-scattering particle size distribution analyzer MT3000II series manufactured by Nikkiso Co., Ltd.) of, for example, 2 μm or more, preferably 3 μm or more, and for example, 5 μm or less, preferably 4 μm or less are used.

By blending the Zn powder, heating at the time of brazing melts Zn to form a Zn diffusion layer (Zn layer), and therefore improvement in corrosion resistance can be achieved.

The brazing composition has a Zn powder content of 1 part by mass or more, preferably 3 parts by mass or more, more preferably 5 parts by mass or more, and 10 parts by mass or less, preferably 9 parts by mass or less, more preferably 8 parts by mass or less.

The Zn powder content relative to the total amount of the brazing composition is, for example, 5 mass % or more, preferably 10 mass % or more, more preferably 15 mass % or more, and for example, 40 mass % or less, preferably 35 mass % or less, more preferably 30 mass % or less.

When the Zn powder content is in the above-described range, and when the above-described brazing composition is applied on an aluminum-made member in a usual application amount, a Zn diffusion layer can be formed uniformly and with a sufficient depth, and excellent corrosion resistance can be ensured.

The Si powder is not particularly limited, but those having an average particle size (measurement device: laser diffraction-scattering particle size distribution analyzer MT3000II series manufactured by Nikkiso Co., Ltd.) of for example, 1 μm or more, preferably 2 μm or more, and for example, 30 μm or less, preferably 8 μm or less are used.

By blending the Si powder, heating at the time of brazing forms an Al—Si alloy molten brazing, thereby ensuring brazing performance.

The brazing composition has a Si powder content of 1 part by mass or more, preferably 1.2 parts by mass or more, more preferably 1.4 parts by mass or more and 5 parts by mass or less, preferably 4 parts by mass or less, more preferably 3 parts by mass or less.

The Si powder content relative to the total amount of brazing composition is, for example, 1 mass % or more, preferably 2 mass % or more, more preferably 3 mass % or more, and for example, 20 mass % or less, preferably 19 mass % or less, more preferably 18 mass % or less.

When the Si powder content is in the above-described range, and when the above-described brazing composition is applied on an aluminum-made member in a usual application amount, excellent brazing performance can be ensured.

The mass ratio (Zn/Si) of Zn powder relative to Si powder is 1 or more, preferably 1.5 or more, more preferably 2 or more, and 5 or less, preferably 4.5 or less, more preferably 4 or less.

When the mass ratio (Zn/Si) of the Zn powder relative to the Si powder is in the above-described range, excellent brazing performance can be ensured when the above-described brazing composition is applied on an aluminum-made member in a normal application amount, and at the same time, the Zn diffusion layer can be formed uniformly and with a sufficient depth, and excellent corrosion resistance can be ensured.

The K—Al—F flux is a fluoride flux containing potassium (K), aluminum (Al), and fluorine (F), and is contained to remove oxide films.

Examples of the K—Al—F flux include potassium fluoroaluminates, and to be specific, for example, $KAlF_4$ and $K_3AlF_6$.

For the K—Al—F flux, commercially available products can be used, including, to be specific, Nocolok (registered trademark) Flux (potassium fluoroaluminates, manufactured by Solvay).

These K—Al—F fluxes may be used singly or in a combination of two or more.

The brazing composition has a K—Al—F flux content of 3 parts by mass or more, preferably 4 parts by mass or more, more preferably 5 parts by mass or more, and 10 parts by mass or less, preferably 9 parts by mass or less, more preferably 8 parts by mass or less.

The K—Al—F flux content relative to the total amount of the brazing composition is, for example, 5 mass % or more, preferably 10 mass % or more, more preferably 15 mass % or more, and for example, 40 mass % or less, preferably 35 mass % or less, more preferably 30 mass % or less.

When the K—Al—F flux content is in the above-described range, and when the above-described brazing composition is applied on an aluminum-made member in a usual application amount, excellent brazing performance can be ensured and at the same time, cracks occurrence in the core can be suppressed, and excellent clearance, brazing performance, and corrosion resistance can be ensured.

The (meth)acrylic resin is a component, as a binder, for uniformly providing the brazing composition to the joint portion, and for example, (meth)acrylate polymer is used.

Examples of the (meth)acrylate polymer include a homopolymer of (meth)acrylate, a copolymer of (meth)acrylate, and a copolymer of (meth)acrylates and a hydrophobic monomer and/or a hydrophilic monomer. The (meth)acryl is defined as "acryl and/or methacryl".

Examples of (meth)acrylates include $C_1$ to $C_{18}$ alkyl esters of (meth)acrylic acid such as methyl (meth)acrylate, ethyl (meth)acrylate, propyl (meth)acrylate, butyl (meth)acrylate, (meth)acrylic acid 2-ethylhexyl, and lauryl (meth)acrylate.

These (meth)acrylates may be used singly or in a combination of two or more.

Examples of the hydrophobic monomer include styrenes such as styrene, α-methylstyrene, vinyltoluene, and p-chlorostyrene.

These hydrophobic monomers may be used singly or in a combination of two or more.

Examples of the hydrophilic monomer include carboxyl group-containing monomers including unsaturated carboxylic acids such as (meth)acrylic acid, itaconic acid, crotonic acid, (anhydride) maleic acid, fumaric acid, (anhydride) citraconic acid, or their salts; and sulfonic acid group-containing monomers including unsaturated sulfonic acids such as styrenesulfonic acid, vinylsulfonic acid, allylsulfonic acid, isoprenesulfonic acid, or their salts.

Examples of the hydrophilic monomer further include hydroxyl group-containing monomers including hydroxyl group-containing (meth)acrylates such as 2-hydroxyethyl (meth)acrylate, hydroxypropyl (meth)acrylate, polypropylene glycol (meth)acrylate, polyethylene glycol (meth)acrylate, and (meth)acrylates having alkylene oxide added to the ester moiety (e.g., $CH_2=C(CH_3)COO(C_2H_4O)_nH$ (n is an integer of, for example, 2 to 12), etc.).

These hydrophilic monomers may be used singly or in a combination of two or more.

For the (meth)acrylate polymer, preferably, a homopolymer of (meth)acrylates, and a copolymer of (meth)acrylate and a hydrophilic monomer are used.

When a copolymer of (meth)acrylate and a hydrophilic monomer is used, the hydroxyl group-containing monomer content of all the constituent monomers of the (meth)acrylate polymer is, for example, 10 mass % or less relative to the total amount of the monomer.

For the monomer that forms the (meth)acrylate polymer, preferably, methacrylic monomers are used.

When methacrylic monomers are used, compared with the case where acrylic monomers (acrylate, acrylic acid, etc.) are used, excellent brazing performance can be ensured.

Such a (meth)acrylate polymer can be produced, without limitation, for example, by radical polymerization of the above-described monomer with a known polymerization methods such as bulk polymerization, solution polymerization, and suspension polymerization.

The (meth)acrylate polymer has a polystyrene-based weight-average molecular weight with gel permeation chromatography of for example, 10000 or more, preferably, 50000 or more, and for example, 600000 or less, preferably 500000 or less.

The weight-average molecular weight of (meth)acrylate polymer can be set suitably by adjusting the blending amount of the radical polymerization initiator.

The (meth)acrylate polymer has an acid number (measurement method: in conformity with JISK 2501) of, for example, 0 mg KOH/g or more, preferably 15 mg KOH/g or more, and for example, 65 mg KOH/g or less, preferably 40 mg KOH/g or less.

The brazing composition has a (meth)acrylic resin content of 1 part by mass or more, preferably 1.2 parts by mass or more, more preferably 1.4 parts by mass or more, and 3 parts by mass or less, preferably 2.5 parts by mass or less, more preferably 2 parts by mass or less.

The (meth)acrylic resin content relative to the total amount of the brazing composition is, for example, 1 mass % or more, preferably 2 mass % or more, more preferably 3 mass % or more, and for example, 15 mass % or less, preferably 10 mass % or less, more preferably 5 mass % or less.

When the (meth)acrylic resin content is in the above-described range, and when the above-described brazing composition is applied on an aluminum-made member in a usual application amount, excellent adherence can be ensured and excellent brazing performance can be ensured.

The brazing composition may further contain an organic solvent (excluding the polyhydric alcohol described later) in view of reducing its surface tension, improving wettability to application target for uniform application.

The organic solvent is not particularly limited as long as the organic solvent is the one generally used for brazing compositions, including, for example, monohydric alcohols, ethers, and ketones. These organic solvents may be used singly or in a combination of two or more.

For the organic solvent, in view of dryness, preferably, monohydric alcohols are used.

Examples of the monohydric alcohol include, to be specific, methylalcohol, ethylalcohol, n-propylalcohol, isopropylalcohol, n-butylalcohol, isobutylalcohol, s-butylalcohol, t-butylalcohol, 3-methoxy-3-methyl-1-butanol, ethylene glycol monomethylether (methyl cellosolve), ethylene glycol monoethylether (ethyl cellosolve), ethylene glycol monobutylether (butyl cellosolve), diethylene glycolmethylether (methyl carbitol), diethylene glycolethylether (ethyl carbitol), diethylene glycolbutylether (butyl carbitol), propylene glycol monomethylether, propylene glycol monoethylether, propylene glycol monobutylether, dipropylene glycol monomethylether, dipropylene glycol monoethylether, and dipropylene glycol monobutylether. These monohydric alcohols may be used singly or in a combination of two or more.

When the brazing composition contains an organic solvent, the organic solvent content is, for example, 5 parts by mass or more, preferably 10 parts by mass or more, more preferably 15 parts by mass or more, and for example, 45 parts by mass or less, preferably 40 parts by mass or less, more preferably 35 parts by mass or less.

The organic solvent content relative to the total amount of the brazing composition is, for example, 10 mass % or more, preferably 20 mass % or more, more preferably 30 mass % or more, and for example, 70 mass % or less, preferably 60 mass % or less, more preferably 50 mass % or less.

The brazing composition preferably further contains an anti-settling agent, in view of prevention of settling of Zn powder and improvement in dispersiveness.

For the anti-settling agent, for example, polyhydric alcohols are used.

Polyhydric alcohol is a compound containing two or more hydroxyl groups (OH) in its molecule. To be specific, examples thereof include dihydric alcohols such as ethylene glycol, diethylene glycol, triethylene glycol, propylene glycol, dipropylene glycol, trimethyleneglycol, 1,3-butanediol, 2,3-butanediol, 1,4-butanediol, 1,5-pentanediol, 1,6-hexanediol, 2-methyl-2,4-pentanediol (hexylene glycol), glyceryl monoacetate, and glyceryl monobutyrate; trihydric alcohols such as glycerine, trimethylolpropane, trimethylolethane, and triethylolethane; tetrahydric alcohols such as pentaerythritol and diglycerol; pentahydric alcohols such as triglycerine; and hexahydric alcohols such as dipentaerythritol. These polyhydric alcohols may be used singly or in a combination of two or more.

For the anti-settling agent, other than the polyhydric alcohols, the above-described monohydric alcohol can be used. In view of preventing settling of Zn powder, preferably, polyhydric alcohols are used.

For the polyhydric alcohol, preferably, a polyhydric alcohol having 3 or less carbon atoms that are bonded by a carbon-carbon bond.

When the brazing composition contains the polyhydric alcohol having 3 or less carbon atoms that are bonded by a carbon-carbon bond, compared with the case where a polyhydric alcohol (e.g., hexylene glycol, etc.) having more than three carbon atoms that are bonded by a carbon-carbon bond is contained, more excellent prevention of Zn powder settling can be achieved.

For such a polyhydric alcohol, to be specific, the following compounds are used: a compound having 3 or less carbon atoms and having two or more molecular-terminal hydroxyl groups; or a compound in which a hydrocarbon unit with 3 or less carbon atoms is bonded in a plural number through a heteroatom such as oxygen atom and having two or more hydroxyl groups at its molecular-terminal.

Examples of the former compound include, to be more specific, ethylene glycol, propylene glycol, and glycerine.

Examples of the latter compound include, to be more specific, polyols having a plurality of oxyethylenes and/or oxypropylenes, to be more specific, diethylene glycol, and dipropylene glycol.

For the polyhydric alcohol, preferably, former compound, that is, a compound having 3 or less carbon atoms, and two or more hydroxyl groups at molecular-terminal, is used.

For the polyhydric alcohol, preferably, polyhydric alcohol with excellent absorbency is selected. Use of the polyhydric alcohol with excellent absorbency allows for suppression of reaction between the Zn powder and water even if water enters into the system.

Examples of such polyhydric alcohol include, to be specific, polyhydric alcohols having 3 or less carbon atoms, and more preferably, dihydric alcohols having 3 or less carbon atoms.

When the brazing composition contains an anti-settling agent, the anti-settling agent content is, for example, 2 parts by mass or more, preferably 3 parts by mass or more, more preferably 4 parts by mass or more, and for example, 10 parts by mass or less, preferably 9 parts by mass or less, more preferably 8 parts by mass or less.

The anti-settling agent content relative to the total amount of the brazing composition is, for example, 5 mass % or more, preferably 8 mass % or more, more preferably 10 mass % or more, and for example, 20 mass % or less, preferably 18 mass % or less, more preferably 15 mass % or less.

When the anti-settling agent is blended at the above-described lower limit or more, excellent settling prevention can be ensured, and therefore the Zn powder can be excellently dispersed, and also excellent absorbency can be ensured, and therefore reaction between the Zn powder and water can be suppressed excellently. Furthermore, when the anti-settling agent is blended at the above-described upper limit or less, excellent dryness can be ensured, and also excellent brazing performance can be ensured.

The brazing composition can be produced by mixing and stirring the above-described components at the above-described content by a known method.

The produced brazing composition has a solid content concentration of, for example, 15 mass % or more, preferably 30 mass % or more, more preferably 45 mass % or more, and for example, 85 mass % or less, preferably 70 mass % or less, more preferably 55 mass % or less.

The brazing composition has a viscosity at 25° C. (measurement device: E type viscometer manufactured by TOKI SANGYO CO., LTD., 100 rpm/1°34' cone) of, for example, 20 Pa·s or more, preferably 100 Pa·s or more, and for example, 1000 Pa·s or less, preferably 500 Pa·s or less.

The brazing composition may contain, as necessary, for example, various additives such as an antioxidant (e.g., dibutylhydroxytoluene, etc.), corrosion inhibitors (e.g., benzotriazole, etc.), antifoaming agents (e.g., silicone oil, etc.), thickening agents (e.g., wax, hydrogenated oil, fatty acid amide, polyamide, etc.), and coloring agents, to the extent that does not damage the effects of the present invention.

For example, addition of a thickening agent allows for further improvement in storage stability, sagging prevention properties, and brazing performance of the produced brazing composition.

Such a brazing composition contains the Zn powder, Si powder, K—Al—F flux, and (meth)acrylic resin at a specific proportion, and therefore well-balanced brazing performance, corrosion resistance, and adherence can be achieved.

Thus, a brazing composition of the present invention is suitably used for aluminum or aluminum alloy products, for example, a heat exchanger tube and in production of a heat exchanger.

Figure 1:
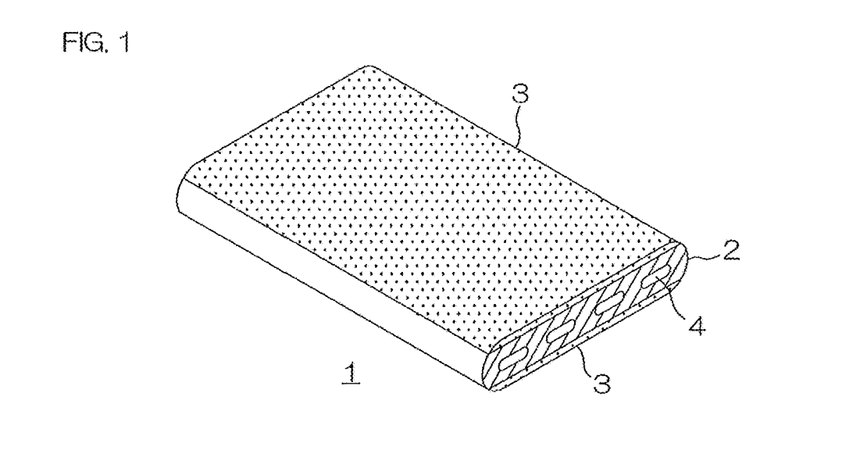
FIG. 1 is a schematic perspective view illustrating an embodiment of a heat exchanger tube of the present invention.

FIG. 1 is a schematic perspective view illustrating an embodiment of a heat exchanger tube of the present invention.

In FIG. 1, a heat exchanger tube 1 includes a flat tube 2 as a tube main body, and a coating for brazing 3 formed at an external surface of the flat tube 2.

The flat tube 2 is worked by extrusion or drawing so that its cross section is flat-shaped from aluminum or an aluminum alloy, preferably from JIS 1050 aluminum alloy.

The flat tube 2 includes a plurality of heating medium passages 4 in spaced-apart relation in a direction (width direction) perpendicular to the direction of extension of the flat tube 2.

The heating medium passages 4 have a cross section of a laterally elongated hole, and are formed to penetrate in a direction of the extension of the flat tube 2.

The coating for brazing 3 is a coating formed by applying and drying the above-described brazing composition, and is formed on one side and the other side of the flat tube 2, that is, both sides of the flat tube 2 having a flat-shaped cross section.

In the coating for brazing 3, the amount of the above-described components applied is, in a solid content, as follows: Zn powder of 1 g/m² or more, preferably 3 g/m² or more, more preferably 5 g/m² or more and 10 g/m² or less, preferably 9 g/m² or less, more preferably 8 g/m² or less.

The amount of the Si powder applied is 1 g/m² or more, preferably 1.2 g/m² or more, more preferably 1.4 g/m² or more, and 5 g/m² or less, preferably 4 g/m² or less, more preferably 3 g/m² or less.

The amount of the K—Al—F flux is 3 g/m² or more, preferably, 4 g/m² or more, more preferably, 5 g/m² or more, and 10 g/m² or less, preferably 9 g/m² or less, more preferably 8 g/m² or less.

The amount of the (meth)acrylic resin is 1 g/m² or more, preferably 1.2 g/m² or more, more preferably 1.4 g/m² or more, and 3 g/m² or less, preferably 2.5 g/m² or less, more preferably, 2 g/m² or less.

In the coating for brazing 3, the total amount of the Zn powder, Si powder, K—Al—F flux, and (meth)acrylic resin is 6 g/m² or more, preferably 7 g/m² or more, more preferably 10 g/m² or more, and for example, 20 g/m² or less, preferably 18 g/m² or less, more preferably 16 g/m² or less.

When the total amount of the Zn powder, Si powder, K—Al—F flux, and (meth)acrylic resin is the above-described lower limit or more, excellent brazing performance and corrosion resistance can be ensured. When the total amount of the Zn powder, Si powder, K—Al—F flux, and (meth)acrylic resin is the above-described upper limit or less, excellent brazing performance and corrosion resistance can be ensured.

The coating for brazing 3 has a thickness of, for example, 5 μm or more, preferably 10 μm or more, and for example, 25 μm or less, preferably 20 μm or less.

The heat exchanger tube 1 is suitably used, for example, in production of heat exchangers mounted in, for example, automobiles.

Figure 2:
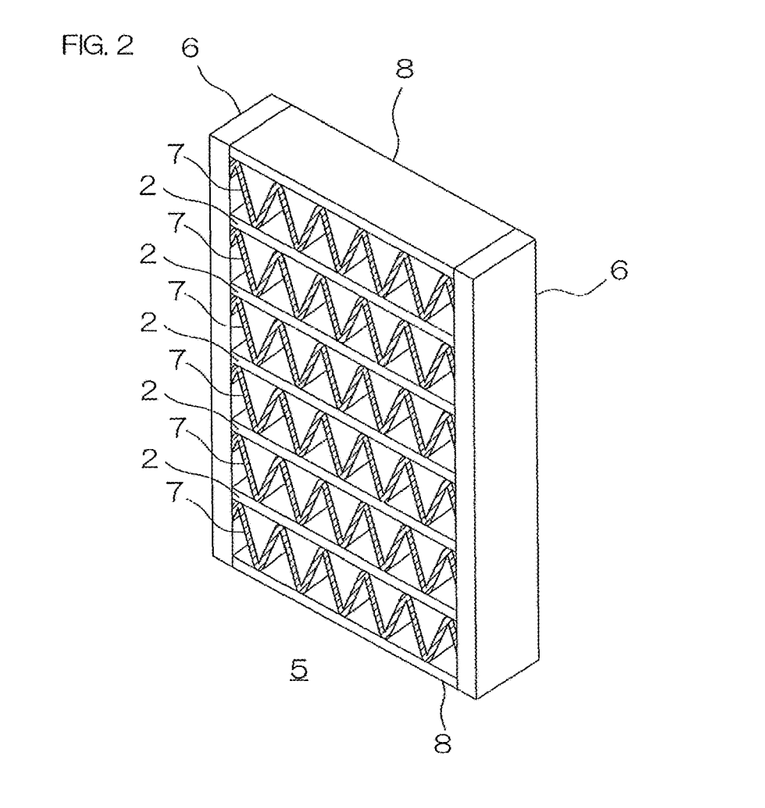
FIG. 2 is a schematic diagram illustrating an embodiment of the heat exchanger of the present invention.

FIG. 2 is a schematic diagram illustrating the configuration of an embodiment of a heat exchanger in which the heat exchanger tube shown in FIG. 1 is used.

In FIG. 2, the heat exchanger 5 includes a pair of header pipes 6 disposed to face each other in spaced-apart relation to each other, a plurality of flat tubes 2 that are provided between the pair of header pipes 6 in spaced-apart relation to each other in a direction of extension of the pair of header pipes 6, and fins 7 that are provided between the flat tubes 2 that are next to each other.

The header pipe 6 is a pipe to which the heating medium is supplied and from which the heating medium is discharged. To one header pipe 6, an introduction pipe (not shown) is connected to introduce the heating medium, and to the other header pipe 6, a discharge pipe (not shown) is connected to discharge the heating medium.

Each of the header pipes 6 has an opening (not shown) at their surface facing each other.

The flat tube 2 is the flat tube 2 that is a constituent of the above-described heat exchanger tube 1, and is provided along the direction along which the pair of header pipes 6 are facing.

To be specific, the flat tubes 2 are provided between the header pipes 6 so that the heating medium passages 4 communicate with the inner space of the header pipes 6 through the opening formed in the header pipes 6. In this fashion, the heating medium flows into one header pipe 6 from the introduction pipe (not shown), and then thereafter the heating medium passes the heating medium passages 4 of the flat tubes 2 and enters into the other header pipe 6, to be dischargeable from the discharge pipe (not shown).

The fins 7 are formed into a continuous wave shape by bending a plate material composed of aluminum or an aluminum alloy. The vertexes (upper vertexes and lower vertexes of the wave) of the fins 7 are brazed to a pair of flat tubes 2, between the pair of flat tubes 2 that are next to each other.

The fins 7 are also brazed to the outer surface of the outermost flat tube 2, and at the outer side of the fin 7, a protection plate 8 is brazed for protecting the brazed fins 7.

Then, a method for producing the heat exchanger 5 is described.

In this method, first, a pair of header pipes 6 is disposed in parallel with each other in spaced-apart relation. Then, both end portions of the plurality of heat exchanger tubes 1 are inserted in openings (not shown) provided at the innerside face of the pair of header pipes 6, to provide the heat exchanger tubes 1 between the pair of header pipes 6. Thereafter, the fins 7 are disposed between the heat exchanger tubes 1 to bring the fins 7 into contact against the coating for brazing 3, thereby producing an assembly. Then, the produced assembly was heated in a heating furnace.

In this fashion, first, for example, at near 420° C., the Zn powder in the coating for brazing 3 of the heat exchanger tube 1 melts to form a Zn diffusion layer on the flat tube 2. Thereafter, with further heating, the coating for brazing 3 melts to form an Al—Si alloy, for example, at 577 to 600° C. In this manner, the flat tubes 2 are brazed to the header pipes 6, and at the same time, the flat tubes 2 are brazed to the fins 7, thereby producing the heat exchanger 5.

In the heat exchanger tube 1 and the heat exchanger 5, the above-described brazing composition is used, and therefore excellent brazing performance, corrosion resistance, and adherence can be achieved.

EXAMPLES

The present invention is described below based on Synthesis Example, Examples, and Comparative Examples, but the present invention is not limited to Examples below. "Parts" and "%" are based on mass unless otherwise specified.

Synthesis Example 1 (Synthesis of Methacrylate Resin)

A reactor equipped with a stirrer, a condenser tube, a dropping funnel, and a nitrogen inlet tube was charged with 600 parts of 3-methoxy-3-methyl-1-butanol, and thereafter, the temperature was increased until the temperature of the system was 80° C. under a nitrogen stream.

Then, a solution mixture of 100 parts of methyl methacrylate, 275 parts of isobutyl methacrylate, 25 parts of methacrylic acid, and 4 parts of benzoyl peroxide was dropped in the system taking about 3 hours, and the temperature was kept the same for further 10 hours to complete polymerization, thereby producing a methacrylate resin solution. The produced methacrylate resin solution had a solid content concentration of 40 mass %, and an acid number when dried of about 40 mgKOH/g.

Examples 1 to 12 and Comparative Examples 1 to 13

An anti-settling agent was added to the methacrylate resin solution at a mixing ratio shown in Table 1 and Table 2. After sufficiently stirring the mixture, Zn powder, Si powder, and Nocolok (registered trademark) Flux (K—Al—F flux, manufactured by Solvay) were mixed thereto, and the mixture was further stirred. Thereafter, 3-methoxy-3-methyl-1-butanol was added, thereby preparing a brazing composition having a solid content concentration of 50%.

The produced brazing composition was applied to an aluminum plate in an amount such that the total amount of the coating after dried was the amount shown in Table 1 and Table 2, and an aluminum plate was disposed separately at the coating portion such that the disposed aluminum plate formed an inverse T-shape. Heating was performed to a temperature of 600° C., thereby conducting a brazing test, and producing an assembly sample.

TABLE 1

| Example No. | | Example 1 | Example 2 | Example 3 | Example 4 | Example 5 | Example 6 |
|---|---|---|---|---|---|---|---|
| Composition | Zn powder | 20.0% | 20.0% | 20.0% | 20.0% | 26.3% | 18.5% |
| | Si powder | 5.0% | 5.0% | 5.0% | 5.0% | 13.2% | 3.7% |
| | Flux | 20.0% | 20.0% | 20.0% | 20.0% | 7.9% | 22.2% |
| | Methacrylate Resin | 5.0% | 5.0% | 5.0% | 5.0% | 2.6% | 5.6% |
| | Solvent (3MMB) | 40.0% | 40.0% | 40.0% | 40.0% | 40.0% | 40.0% |
| | Anti-settling agent | 10% | 10% | 10% | 10% | 10% | 10% |
| | Anti-settling agent types | PG | GLY | DEG | IPA | PG | PG |
| Evaluation | Settling properties | Good | Good | Good | OK | Good | Good |
| Coating Total Amount (Solid Content) | | 15.0g/m$^2$ | 15.0g/m$^2$ | 15.0g/m$^2$ | 15.0g/m$^2$ | 19.0g/m$^2$ | 13.5g/m$^2$ |
| Coating | Zn powder | 6.0g/m$^2$ | 6.0g/m$^2$ | 6.0g/m$^2$ | 6.0g/m$^2$ | 10.0g/m$^2$ | 5.0g/m$^2$ |
| | Si powder | 1.5g/m$^2$ | 1.5g/m$^2$ | 1.5g/m$^2$ | 1.5g/m$^2$ | 5.0g/m$^2$ | 1.0g/m$^2$ |
| | Flux | 6.0g/m$^2$ | 6.0g/m$^2$ | 6.0g/m$^2$ | 6.0g/m$^2$ | 3.0g/m$^2$ | 6.0g/m$^2$ |
| | Methacrylate Resin | 1.5g/m$^2$ | 1.5g/m$^2$ | 1.5g/m$^2$ | 1.5g/m$^2$ | 1.0g/m$^2$ | 1.5g/m$^2$ |
| | Zn/Si ratio | 4 | 4 | 4 | 4 | 2 | 5 |
| Evaluation | Adherence | Good | Good | Good | Good | Good | Good |
| | Brazing Performance | Good | Good | Good | Good | Good | OK |
| | Zn diffusion | Good | Good | Good | Good | Good | Good |

| Example No. | | Example 7 | Example 8 | Example 9 | Example 10 | Example 11 | Example 12 |
|---|---|---|---|---|---|---|---|
| Composition | Zn powder | 20.0% | 15.0% | 15.8% | 20.0% | 17.9% | 8.3% |
| | Si powder | 5.0% | 5.0% | 3.9% | 5.0% | 17.9% | 8.3% |
| | Flux | 20.0% | 15.0% | 26.3% | 20.0% | 10.7% | 25.0% |
| | Methacrylate Resin | 5.0% | 15.0% | 3.9% | 5.0% | 3.6% | 8.3% |

TABLE 1-continued

|  |  |  |  |  |  |  |  |
|---|---|---|---|---|---|---|---|
|  | Solvent (3MMB) | 40.0% | 40.0% | 40.0% | 40.0% | 40.0% | 40.0% |
|  | Anti-settling agent | 10% | 10% | 10% | 10% | 10% | 10% |
|  | Anti-settling agent types | PG | PG | PG | HG | PG | PG |
| Evaluation | Settling properties | Good | Good | Good | Bad | Good | Good |
| Coating | Total Amount (Solid Content) | 20.0g/m$^2$ | 10.0g/m$^2$ | 19.0g/m$^2$ | 5.0g/m$^2$ | 14.0g/m$^2$ | 6.0g/m$^2$ |
| Coating | Zn powder | 8.0g/m$^2$ | 3.0g/m$^2$ | 6.0g/m$^2$ | 6.0g/m$^2$ | 5.0g/m$^2$ | 1.0g/m$^2$ |
|  | Si powder | 2.0g/m$^2$ | 1.0g/m$^2$ | 1.5g/m$^2$ | 1.5g/m$^2$ | 5.0g/m$^2$ | 1.0g/m$^2$ |
|  | Flux | 8.0g/m$^2$ | 3.0g/m$^2$ | 10.0g/m$^2$ | 6.0g/m$^2$ | 3.0g/m$^2$ | 3.0g/m$^2$ |
|  | Methacrylate Resin | 2.0g/m$^2$ | 3.0g/m$^2$ | 1.5g/m$^2$ | 1.5g/m$^2$ | 1.0g/m$^2$ | 1.0g/m$^2$ |
|  | Zn/Si ratio | 4 | 3 | 4 | 4 | 1 | 1 |
| Evaluation | Adherence | Good | Good | Good | Good | Good | Good |
|  | Brazing Performance | Good | Good | Good | Good | OK | OK |
|  | Zn diffusion | Good | Good | Good | Good | OK | OK |

TABLE 2

| Comp. Ex. No. |  | Comp. Ex. 1 | Comp. Ex. 2 | Comp. Ex. 3 | Comp. Ex. 4 | Comp. Ex. 5 | Comp. Ex. 6 | Comp. Ex. 7 |
|---|---|---|---|---|---|---|---|---|
| Composition | Zn powder | 38.6% | 10.9% | 26.2% | 20.0% | 27.8% | 25.0% | 15.0% |
|  | Si powder | 2.4% | 12.7% | 4.2% | 5.0% | 7.0% | 15.0% | 3.8% |
|  | Flux | 7.2% | 21.7% | 15.7% | 20.0% | 12.7% | 7.5% | 27.5% |
|  | Methacrylate Resin | 1.8% | 4.7% | 3.9% | 5.0% | 2.5% | 2.5% | 3.8% |
|  | Solvent (3MMB) | 50.0% | 40.0% | 40.0% | 40.0% | 40.0% | 40.0% | 40.0% |
|  | Anti-settling agent | — | 10% | 10% | 10% | 10% | 10% | 10% |
|  | Anti-settling agent types | — | PG | PG | PG | PG | PG | PG |
| Evaluation | Settling properties | Bad | Good | Good | Good | Good | Good | Good |
| Coating | Total Amount (Solid Content) | 41.5g/m$^2$ | 13.8g/m$^2$ | 19.1g/m$^2$ | 22.5g/m$^2$ | 19.8g/m$^2$ | 20.0g/m$^2$ | 20.0g/m$^2$ |
| Coating | Zn powder | 32.0g/m$^2$ | 3.0g/m$^2$ | 10.0g/m$^2$ | 9.0g/m$^2$ | 11.0g/m$^2$ | 10.0g/m$^2$ | 6.0g/m$^2$ |
|  | Si powder | 2.0g/m$^2$ | 3.5g/m$^2$ | 1.6g/m$^2$ | 2.3g/m$^2$ | 2.8g/m$^2$ | 6.0g/m$^2$ | 1.5g/m$^2$ |
|  | Flux | 6.0g/m$^2$ | 6.0g/m$^2$ | 6.0g/m$^2$ | 9.0g/m$^2$ | 5.0g/m$^2$ | 3.0g/m$^2$ | 11.0g/m$^2$ |
|  | Methacrylate Resin | 1.5g/m$^2$ | 1.3g/m$^2$ | 1.5g/m$^2$ | 2.3g/m$^2$ | 1.0g/m$^2$ | 1.0g/m$^2$ | 1.5g/m$^2$ |
|  | Zn/Si ratio | 16.0 | 0.9 | 6.3 | 4.0 | 4.0 | 1.7 | 4.0 |
| Evaluation | Adherence | Good | Good | Good | Good | Good | Good | Good |
|  | Brazing Performance | Bad | Good | Bad | Bad | Bad | Bad | Bad (core cracking) |
|  | Zn diffusion | Good | Bad | Good | Good | Good | Good | Bad (core cracking) |

| Comp. Ex. No. |  | Comp. Ex. 8 | Comp. Ex. 9 | Comp. Ex. 10 | Comp. Ex. 11 | Comp. Ex. 12 | Comp. Ex. 13 |
|---|---|---|---|---|---|---|---|
| Composition | Zn powder | 17.1% | 20.0% | 4.3% | 13.9% | 27.3% | 21.4% |
|  | Si powder | 4.3% | 5.0% | 5.4% | 3.5% | 6.8% | 5.4% |
|  | Flux | 17.1% | 20.0% | 32.3% | 26.1% | 9.1% | 21.4% |
|  | Methacrylate Resin | 11.4% | 5.0% | 8.1% | 6.5% | 6.8% | 1.8% |
|  | Solvent (3MMB) | 40.0% | 40.0% | 40.0% | 40.0% | 40.0% | 40.0% |
|  | Anti-settling agent | 10% | 10% | 10% | 10% | 10% | 10% |
|  | Anti-settling agent types | PG | PG | PG | PG | PG | PG |
| Evaluation | Settling properties | Good | Good | Good | Good | Good | Good |
| Coating | Total Amount (Solid Content) | 17.5g/m$^2$ | 7.5g/m$^2$ | 9.3g/m$^2$ | 11.5g/m$^2$ | 11.0g/m$^2$ | 14.0g/m$^2$ |

TABLE 2-continued

| | | | | | | | |
|---|---|---|---|---|---|---|---|
| Coating | Zn powder | 6.0g/m² | 3.0g/m² | 0.8g/m² | 3.2g/m² | 6.0g/m² | 6.0g/m² |
| | Si powder | 1.5g/m² | 0.8g/m² | 1.0g/m² | 0.8g/m² | 1.5g/m² | 1.5g/m² |
| | Flux | 6.0g/m² | 3.0g/m² | 6.0g/m² | 6.0g/m² | 2.0g/m² | 6.0g/m² |
| | Methacrylate Resin | 4.0g/m² | 0.8g/m² | 1.5g/m² | 1.5g/m² | 1.5g/m² | 0.5g/m² |
| | Zn/Si ratio | 4.0 | 4.0 | 0.8 | 4.0 | 4.0 | 4.0 |
| Evaluation | Adherence | Good | Good | Good | Good | Good | Bad |
| | Brazing Performance | Bad | Bad | Good | Bad | Bad | Good |
| | Zn diffusion | Good | Good | Bad | Good | Good | Good |

Abbribiations in Tables are described below.
Flux: Nocolok (registered trademark) Flux (K—Al—F flux, manufactured by Solvay)
3MMB: 3-methoxy-3-methyl-1-butanol
PG: propylene glycol
GLY: glycerine
DEG: diethylene glycol
IPA: isopropyl alcohol
HG: hexylene glycol <Evaluation>
(1) Settling Properties The brazing composition produced in Examples and Comparative Examples was stored as is for one week, and the degree of sediment at the container bottom was observed visually, thereby evaluating settling properties. The evaluation is based on the following criteria.
Good: disperses by light shaking.
OK: disperses by mechanical stirring.
Bad: the sedimentation is solidified, and not dispersed even with mechanical stirring.

(2) Adherence

Pencil hardness test (measurement method: in conformity with JIS K5600) was performed for the aluminum plate produced in Examples and Comparative Examples and to which the brazing composition was applied, and adherence of the dried coating was evaluated. The higher (harder) pencil hardness shows more excellent adherence.

The evaluation is based on the following criteria.
Good: Coating adherence was pencil hardness of HB or more
OK: Coating adherence was pencil hardness of less than HB and 3B or more
Bad: Coating adherence was pencil hardness of less than 3B (3) Brazing Performance Discoloration of the assembly sample produced in Examples and Comparative Examples was checked, and the fillet length was measured, thereby evaluating brazing performance. Those samples with no discoloration, and longer fillet length showed more excellent brazing performance.

The evaluation is based on the following criteria.
Good: undecomposed residue of methacrylate resin and discoloration due to unmelted and remained Si powder were not observed, and a fillet with a size of 20 mm or more (one side) was formed.
OK: blackening due to undecomposed residue of methacrylate resin was partially observed, but a fillet with a size of 20 mm or more (one side) was formed.
Bad: discoloration due to unmelted and remained Si powder was observed in the test piece overall, and a fillet with a size of 20 mm or less (one side) was formed.

(4) Zn Diffusion

The Zn diffusion layer at the cross section of the brazing portion of the assembly sample produced in Examples and Comparative Examples was observed with an electron probe micro-analyzer (EPMA), and the diffusion depth of Zn was obtained, thereby evaluating Zn diffusion. The deeper the Zn diffusion depth is, the more the Zn diffusion layer is excellently formed: that is, corrosion resistance was excellent.

The evaluation is based on the following criteria.
Good: Zn diffusion depth was 50 μm or more
OK: Zn diffusion depth was less than 50 μm and 20 μm or more
Bad: Zn diffusion depth was less than 20 μm While the illustrative embodiments of the present invention are provided in the above description, such is for illustrative purpose only and it is not to be construed as limiting in any manner. Modification and variation of the present invention that will be obvious to those skilled in the art is to be covered by the following claims.

INDUSTRIAL APPLICABILITY

The brazing composition of the present invention can be suitably used in production of tubes used in heat exchangers such as aluminum heat exchangers.

The heat exchanger tube of the present invention can be suitably used in production of heat exchangers such as aluminum heat exchangers.

The heat exchanger of the present invention can be suitably used as heat exchangers for automobiles.

The invention claimed is:

1. A heat exchanger tube comprising:
    a tube main body, and
    a coating for brazing formed at an external surface of the tube main body, the coating for brazing comprising:
        1 g/m² or more and 10 g/m² or less of Zn powder,
        1 g/m² or more and 5 g/m² or less of Si powder,
        3 g/m² or more and 10 g/m² or less of a K—Al—F flux, and
        1 g/m² or more and 3 g/m² or less of methacrylate resin, and
    having a mass ratio (Zn/Si) of Zn powder relative to Si powder of 1 or more and 5 or less,
    wherein the total amount of Zn powder, Si powder, K—Al—F flux, and (meth)acrylic resin is 6 g/m² or more and 20 g/m² or less,
    the methacrylate resin is a (meth)acrylate polymer, and
    the (meth)acrylate polymer is a copolymer of (meth)acrylates and methacrylic acid.

2. A heat exchanger produced by using the heat exchanger tube according to claim 1.

3. A method of producing a coating, the method comprising applying a brazing composition to a coating and drying, the brazing composition comprising:
    1 parts by mass or more and 10 parts by mass or less of Zn powder,
    1 parts by mass or more and 5 parts by mass or less of Si powder, 3 parts by mass or more and 10 parts by mass or less of a K—Al—F flux, and 1 parts by mass or more and 3 parts by mass or less of methacrylate resin, and having a mass ratio (Zn/Si) of Zn powder relative to Si powder of 1 or more and 4 or less, such that the coating after the drying comprises 1 $g/m^2$ or more and 10 $g/m^2$ or less of Zn powder, 1 $g/m^2$ or more and 5 $g/m^2$ or less of Si powder, 3 $g/m^2$ or more and 10 $g/m^2$ or less of a K—Al—F flux, and 1 $g/m^2$ or more and 3 $g/m^2$ or less of methacrylate resin, and has a mass ratio (Zn/Si) of Zn powder relative to Si powder of 1 or more and 5 or less, wherein the total amount of Zn powder, Si powder, K—Al—F flux, and (meth)acrylic resin is 6 $g/m^2$ or more and 20 $g/m^2$ or less, the methacrylate resin is a (meth)acrylate polymer, and the (meth)acrylate polymer is a copolymer of (meth) acrylates and methacrylic acid.

\* \* \* \* \*